United States Patent [19]

Wang et al.

[11] Patent Number: 4,967,063

[45] Date of Patent: Oct. 30, 1990

[54] CHARGE CONTROLLED ADAPTIVE-OPTICS SYSTEM

[75] Inventors: Charles C. P. Wang, Rancho Palos Verdes; Patrick L. Smith, Redondo Beach, both of Calif.

[73] Assignee: The Aerospace Corporation, El Segundo, Calif.

[21] Appl. No.: 207,676

[22] Filed: Jun. 16, 1988

[51] Int. Cl.$^5$ ............................................. G01J 1/20
[52] U.S. Cl. ................................ 250/201.1; 350/360
[58] Field of Search .......................... 250/201, 213 VT; 350/360

[56] References Cited

U.S. PATENT DOCUMENTS

| | | |
|---|---|---|
| 3,904,274 | 9/1975 | Feinleib et al. |
| 3,923,400 | 12/1975 | Hardy. |
| 4,271,355 | 6/1981 | Wisner et al. ...................... 250/201 |
| 4,472,029 | 9/1984 | Hardy ................................. 350/360 |
| 4,725,138 | 2/1988 | Wirth et al. ........................ 250/201 |
| 4,737,621 | 4/1988 | Gonsiorowski et al. ........... 250/201 |

OTHER PUBLICATIONS

Hardy, "Active Optics: A New Technology for the Control of Light", Proceedings of the IEEE, vol. 66, No. 6, Jun. 1978.

Primary Examiner—Edward P. Westin
Assistant Examiner—Khaled Shami
Attorney, Agent, or Firm—William J. Burke

[57] ABSTRACT

A charge controlled adaptive-optics system is disclosed for correcting phase distortion in a wavefront of a propagating optical wavefront in real time. In a preferred embodiment a selectively deformable piezoelectric mirror receives an incoming distorted optical wavefront and reflects it to a lenslet array optical sensor. The sensor generates a large plurality of focused light points, the offset positions of which represent wavefront tilts at a plurality of locations on the distorted wavefront. A misalignment calibration system calculates a plurality of calibration signals representing aberrations in the mirror surface and the sensor, and converts the signals into a plurality of representative light rays of varying intensity. The light ray are then superimposed on the light points to form a plurality of calibrated light points, which are then input to an electron-beam generating system. The generating system generates a plurality of electron beams of varying intensity that operate to supply and remove electrical charges from electrodes mounted within the piezoelectric mirror. The local electric fields induced by the charges result in a selective deformation of the piezoelectric mirror that corrects the distortion in the reflected wavefront.

10 Claims, 3 Drawing Sheets

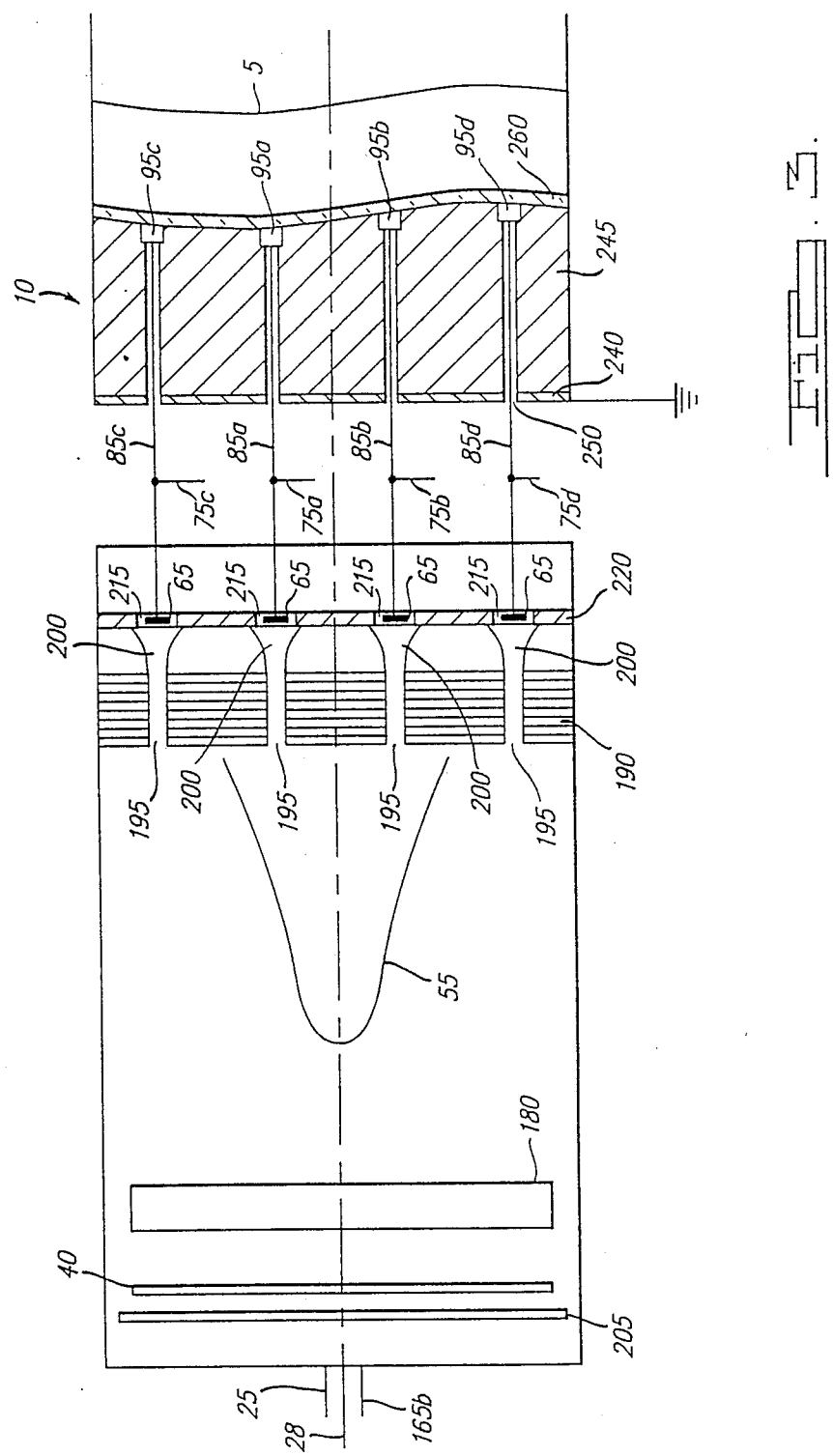

CHARGE CONTROLLED ADAPTIVE-OPTICS SYSTEM

BACKGROUND OF THE INVENTION

1. Technical Field

The disclosed invention relates to optical systems used to correct phase distortion in a propagating optical wavefront and, more particularly, to adaptive-optics systems that correct the phase distortion in real time.

2. Description of Related Art

Adaptive-optics systems are used in a variety of applications where the characteristics of optical elements are selectively changed in real time to modify optical wavefronts being received thereon. One such application is with large ground-based telescopes imaging objects in space, where random atmospheric turbulence and thermal gradients distort a wavefront being received by the telescope. If the telescope is orbiting in space, varying dynamic and thermal stresses can also compromise its optical performance. An adaptive-optics system capable of correcting a distorted wavefront is therefore useful in enabling a large telescope to make full use of its resolving power.

Another application is in active phase conjugation, where the system is used to focus a laser beam through the atmosphere. An incoming wavefront is received and reflected from a selectively deformable mirror deformed to represent the phase conjugate of the incoming wavefront. This results in a reflected wavefront having a distortion impressed thereon that precisely compensates for the distortion in its propagation path, thereby providing a properly focused wavefront that maximizes power density when the wavefront reaches the target.

Prior art adaptive-optics systems typically use a deformable mirror for receiving thereon the incoming distorted wavefront; an interferometer for generating an interferogram indicative of the distortion present in the wavefront; a plurality of photodetectors for reading the interferogram at a corresponding plurality of locations; correction circuitry for computing a corresponding plurality of corrective signals; a corresponding plurality of integrating amplifiers; and a corresponding plurality of high voltage amplifiers for generating and applying varying high-voltage signals representing the corrections to a like plurality of actuator-like elements located in the mirror. The high voltages selectively deform the mirror to provide an outgoing wavefront that is free of the distortion present in the incoming wavefront. A prior art system of this type is disclosed in U.S. Pat. No. 3,923,400. Further prior art adaptive-optics systems, or elements thereof, are disclosed in the following U.S. Pat. Nos.:

| | |
|---|---|
| U.S. Pat. No. 3,904,274 | U.S. Pat. No. 3,766,415 |
| U.S. Pat. No. 3,633,995 | U.S. Pat. No. 3,758,199 |
| U.S. Pat. No. 4,280,756 | U.S. Pat. No. 3,660,777 |
| U.S. Pat. No. 4,257,686 | U.S. Pat. No. 3,567,325 |
| U.S. Pat. No. 4,248,504 | U.S. Pat. No. 4,379,697 |
| U.S. Pat. No. 4,239,343 | U.S. Pat. No. 4,383,763 |
| U.S. Pat. No. 4,160,184 | U.S. Pat. No. 4,322,837 |

Prior art systems are restricted, however, by the realtime operation mandated by the random and rapidly changing nature of the atmospheric disturbances that distort optical wavefronts. Real-time operation will usually require that corrections be calculated and applied to the actuator elements within milliseconds of the wavefront being received on the mirror. This has usually dictated that the corrections be applied in parallel fashion to enable all the corrections to be calculated and applied within the short alloted time intervals. However, a prior art system applying corrections in parallel fashion requires a discrete amplification system for simultaneously calculating and generating high-voltage signals for each actuator element, a powerful digital computer for calculating the corrections in real time, and A/D and D/A hardware not required in a parallel all-analog system.

As is apparent with of prior art systems, the cost and complexity of a system increases as the number of actuators required increases. Because of these restrictions, prior art systems are currently limited to applications where about 200 or less actuator elements are required to accurately null the phase distortion in a wavefront. For atmospheric applications, this has restricted the use of prior art systems to telescopes having primary optics of about 30 cm or less in diameter. In phase conjugation, it has limited the ability of a deformable mirror to accurately focus a large-diameter laser beam incident thereon.

SUMMARY OF THE INVENTION

The disclosed invention utilizes a modulating element for receiving an incoming distorted optical wavefront. The incoming wavefront is then imaged by a lenslet array optical sensor having a large plurality of subapertures for determining wavefront tilt at a corresponding plurality of locations on the wavefront. The lenslet array generates an output which is input to an electron beam generating system. The electron beam generating system then generates a plurality of electron beams of selectively varying intensities which are used to control the modulating element, whereby the modulating element corrects for the phase distortion in the incoming wavefront.

In the preferred embodiment, a deformable piezoelectric mirror is disposed to receive the incoming distorted wavefront. The incoming wavefront is reflected from the mirror to a lenslet array optical sensor, which generates a plurality of focused light points representing wavefront tilt at a plurality of locations on the wavefront. A misalignment calibration system then calculates and supplies a plurality of signals representing aberrations in the lenslet array and the mirror to a cathode ray tube. The cathode ray tube converts the signals into a plurality of light rays representing the aberrations, and the light rays are superimposed on the light points to form a plurality of calibrated light points. The calibrated light points are then input to an electron beam generating system that generates a plurality of charging and discharging electron beams. The electron beams are then used to selectively supply to and remove electrical charges from actuator elements mounted in the mirror, thereby controlling the deformation of the mirror to correct for the phase distortion in the wavefront incident thereon.

By using electrical charges supplied by the electron beams to control the deformation of the mirror, the disclosed invention overcomes the limitations inherent in prior art voltage-controlled systems. Charge control obviates the need for a large plurality of high-voltage amplifiers; a powerful digital computer; extensive and costly A/D and D/A hardware; and a large plurality of photodetectors. Furthermore, charge control enables 10,000 or more actuators to be simultaneously addressed in real time to more accurately control the deformation of a deformable mirror. In uses with telescopes, this allows accurate phase correction of a wavefront being received by a telescope having a primary optic larger than 1 meter in diameter. In phase conjugation, a deformable mirror with 10,000 or more actuators will enable extremely precise focusing of a laser beam 1 meter in diameter being reflected from the mirror. A prior art system capable of real-time control of 10,000 or more actuators would generally require 10,000 or more discrete calculation circuits and high-voltage amplifiers, an extremely powerful serial digital computer for calculating corrections in real time, along with costly multiplexer, A/D and D/A hardware for each channel.

BRIEF DESCRIPTION OF THE DRAWINGS

Various advantages of the present invention will become apparent to one skilled in the art on reading the following specification by reference to the drawings, wherein:

FIG. 3 is an illustration of the electron beam charging system utilizing discharging collectors therein, and the mirror deformed to correct the phase distortion in an incoming wavefront.

DESCRIPTION OF THE PREFERRED EMBODIMENT

Figure 1:
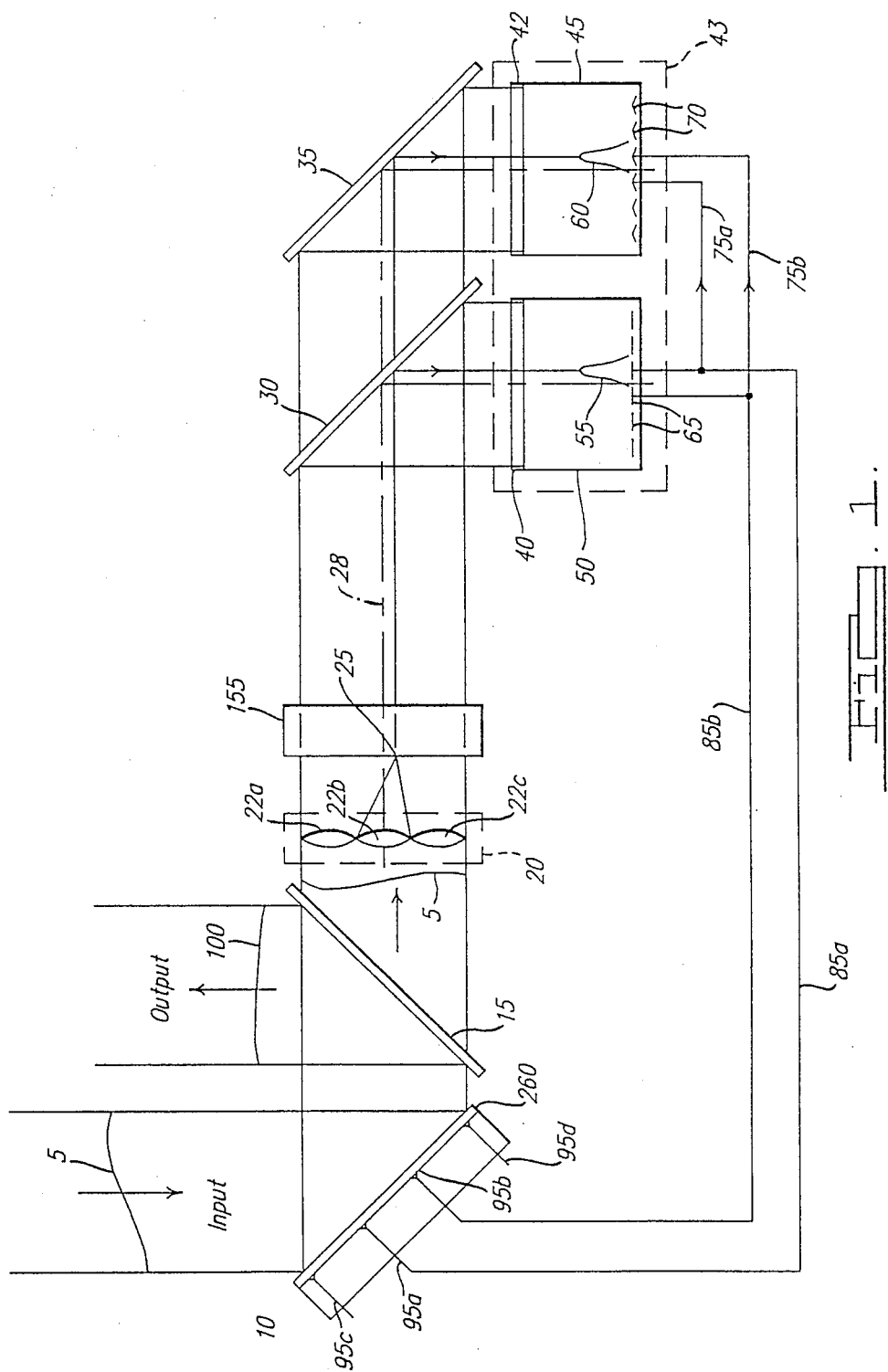
FIG. 1 is an illustration of the preferred embodiment of the invention wherein the electron-beam generating system supplies charging and discharging beams to control the electrical charges transmitted to a deformable piezoelectric mirror.

Referring to FIG. 1, a preferred embodiment of the invention is illustrated. A deformable piezoelectric mirror 10 is disposed to receive an incoming distorted wavefront 5 on its mirror surface 260. The distorted wavefront 5 is reflected off of surface 260 to a first beam splitter 15, where a portion of the input wavefront 5 is reflected therefrom and represented as the output wavefront 100. The portion of the input wavefront 5 that passes through the first beam splitter 15 illuminates a lenslet array optical sensor 20. The lenslet array 20 is shown for simplicity in FIGS. 1 and 2 as having three lenslets 22a, 22b, 22c, also known in the art as subapertures, for imaging the distorted wavefront 5. In practice, the lenslet array 20 will have 10,000 or more adjacently disposed lenslets for imaging the distorted wavefront 5 at a corresponding plurality of locations on the wavefront 5. A lenslet array of this type is available from Applied Optics Associates Corp., Boston, Mass.

When the distorted wavefront 5 is incident on the lenslet array 20, the individual lenslets 22a, 22b, 22c will each generate a focused light point 25 that is offset from an imaginary axis 28 extending transversely through the center of its respective lenslet. Again, only one light point 25 and one imaginary axis 28 have been illustrated for simplicity. The offset of each light point 25 from its respective imaginary axis 28 will represent wavefront tilt at a location on the wavefront being imaged by a particular lenslet. A wavefront with no distortion incident upon lenslet array 20 would instead cause the individual lenslets 22a, 22b, 22c to generate a plurality of light points all focused substantially on their respective imaginary axes.

The light point 25 generated from lenslet 22b will then be reflected by a second beam splitter 30 and illuminate a first photocathode 40 operating in conjunction with an electron-beam charging system 50. A portion of each light point 25 will also pass through the second beam splitter 30 and be reflected off of a mirror 35 onto a second photocathode 42 operating in conjunction with an electron-beam discharging system 45. Together, the charging system 50 and discharging system 45 form an electron-beam generating system 43.

As the light points 25 illuminate the first photocathode 40 and the second photocathode 42, an emission of electrons will be generated from reverse sides of the first photocathode 40 and the second photocathode 42. The charging system 50 will then generate a charging beam pattern 55 from the electrons emitted from the first photocathode 40, and the discharging system 45 will produce a discharging beam pattern 60 from electrons emitted from the second photocathode 42. The charging beam pattern 55 will operate to selectively supply electrical charges to a large plurality of charging collectors 65, while the discharging beam pattern 60 will be simultaneously and selectively operating to remove electrical charges from the discharging collectors 70. The operation of the discharging system will be discussed more fully in the following paragraphs.

As evidenced by interconnecting wires 75a, 75b, the charging collectors 65 and discharging collectors 70 will be electrically connected in a plurality of pairs, each said pair having at least one charging collector 65 and at least one discharging collector 70. The interconnecting wires 75a, 75b will be connected to a large plurality of transmission wires 85a, 85b, and the transmission wires 85a, 85b will be connected to a correspondingly large plurality of selectively addressable electrodes 95a, 95b, 95c, 95d mounted within the piezoelectric wafer 245 (which is illustrated in more detail in FIG. 3). The collectors of each pair will further be disposed within the charging system 50 and discharging system 45 such that when the light point 25 is off center of its imaginary axis 28, the charging beam pattern 55 and the discharging beam pattern 60 will be supplying differing pluralities of electrons to the charging collectors 65 and discharging collectors 70. The differing electrical charges will result in differential charging and discharging of the electrodes 95a, 95b, which will operate to control the deformation of the wafer 245 and the mirror surface 260 adhered thereto to precisely compensate for the wavefront tilt at a plurality of locations on the distorted wavefront 5. The distorted wavefront 5 will then be reflected from the mirror 10 in a near distortion-free condition, as represented by the output wavefront 100. A portion of the output wavefront 100 will then be reflected off of the first beam splitter 15, while a portion will pass through the first splitter 15 and be re-input into the lenslet array 20, thus providing a closed-loop feedback system.

It will be noted that the output wavefront 100 reflected upwardly from the first splitter 15 is not represented in FIG. 1 as a perfectly linear, or distortion-free, wavefront. Although the rapidly fluctuating distortion present in the incoming wavefront 5 caused by atmospheric turbulence will be removed, the output wavefront 100 will still contain slowly fluctuating distortion attributable to thermally induced aberrations in the lenslet array 20 and the mirror surface 260. These will be removed by a misalignment calibration system 168 discussed in the following paragraphs.

Figure 2:
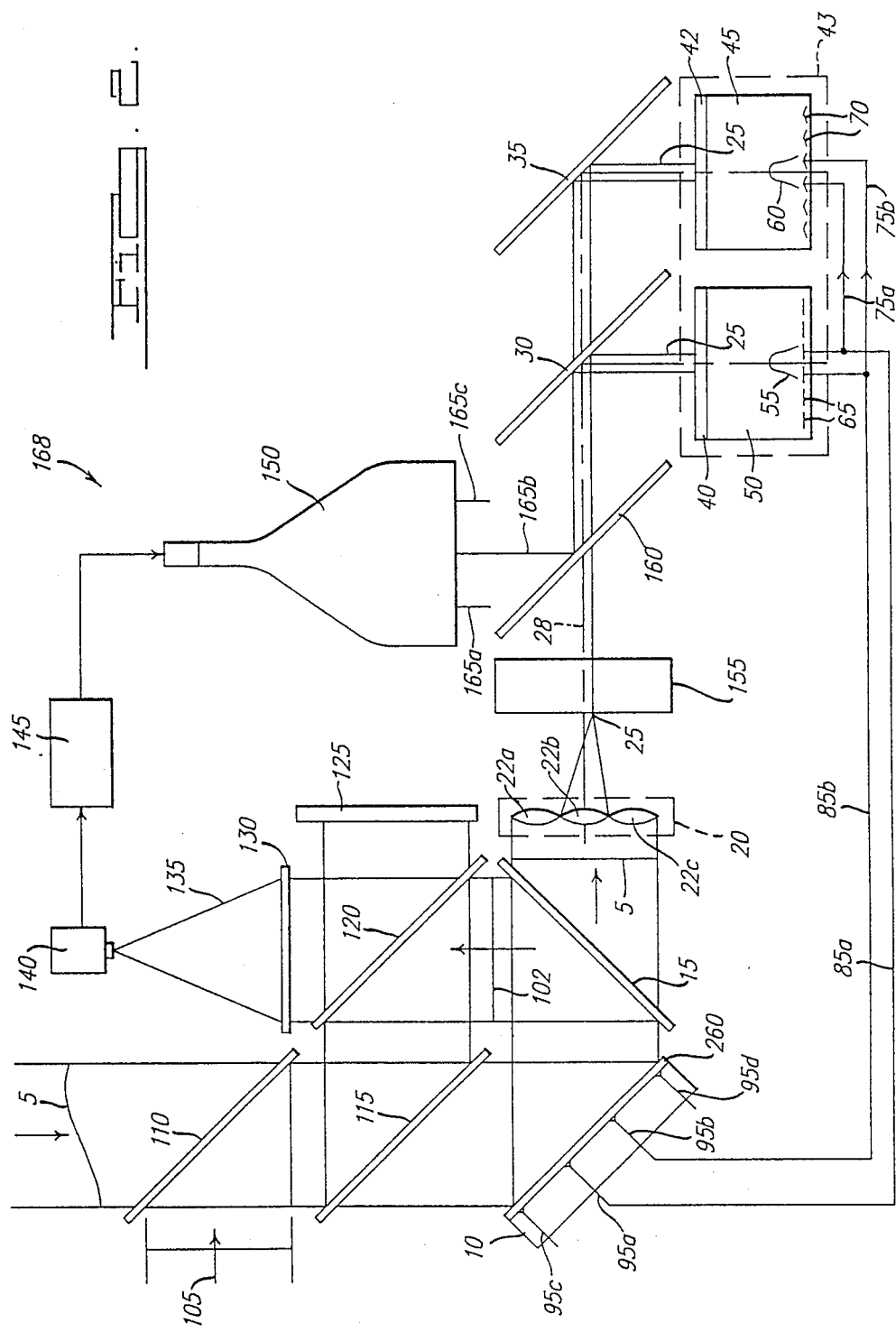
FIG. 2 is an illustration of the preferred embodiment having a misalignment calibration system incorporated therewith.

Referring to FIG. 2, the preferred embodiment of the invention is illustrated having the misalignment calibration system 168 included therewith to correct for misalignment distortion present in the output wavefront 100 depicted in FIG. 1. An undistorted reference beam 105 is input from an external source and reflected off of a third beam splitter 110 towards a fourth beam splitter 115. Reference beam 105 is then reflected from the fourth splitter 115 through a fifth beam splitter 120 and onto a reference flat mirror 125. The incoming distorted wavefront 5 passes through the first beam splitter 110 and the second beam splitter 115 and is reflected from the mirror surface 260 to the first beam splitter 15. A portion of the input wavefront 5 will pass through the first splitter 15, while a portion will be reflected therefrom, as represented by wavefront 102 of FIG. 2. The wavefront 102 will then pass through the fifth splitter 120 and illuminate an imaging screen 130, while the reference beam 105 will be reflected from the reference flat 125 back to the fifth splitter 120, and reflected therefrom toward the imaging screen 130, thus mixing with wavefront 102 thereat. The imaging screen 130 may be a frosted glass or translucent plastic, and will produce an interference intensity pattern 135 representing aberrations caused by misalignments in the splitters 15, 30, 35 and the lenslet array sensor 20.

The interference intensity pattern 135 will then be imaged by a camera 140, which will supply the image to a processing system 145. The processing system 145 utilizes standard wavefront reconstruction circuitry for calculating wavefront aberrations. The output of processing system 145 is then input to a cathode ray tube 150 where the electrical signals are transformed into a plurality of representative light rays 165a, 165b, 165c emanating from the screen of the cathode ray tube 150. The light rays are then directed at a sixth beam splitter 160 where they are superimposed on the light points generated by the lenslet array 20, thereby forming a plurality of calibrated light points. For simplicity, only the path traveled by one light ray 165b is illustrated. A portion of light ray 165b is then reflected from the second splitter 30 onto the first photocathode 40, while a portion of the light ray 165b passes through the second splitter 30 and is reflected from mirror 35 onto the second photocathode 42. As illustrated in FIG. 2, light ray 165b provides a calibration bias signal which operates to center the charging beam 55 and the discharging beam 60 on the imaginary axis 28, thereby providing electron beams of substantially equal intensity to the charging collectors 65 and the discharging collectors 70. The aberrations the processing system is correcting for will typically be thermal or gravitational gradients, which typically change over a period or seconds or minutes, in comparison to the atmospheric turbulence and other atmospheric disturbances distorting the received wavefront, which will typically be changing in milliseconds. The preferred embodiment as depicted in FIG. 2 will therefore function to remove the high-frequency distortion due to atmospheric disturbances, and the misalignment calibrator will function to remove the low-frequency distortion caused by thermal and gravitational gradients.

The preferred embodiment as depicted in FIG. 2 represents the system operating after all aberrations inherent in the system and the phase distortion present in the incoming wavefront 5 have been removed by a controlled deformation of the piezoelectric mirror 10. It will be noticed that the output wavefront 100 depicted in FIG. 1 is now depicted in FIG. 2 as output wavefront 102, and is in perfect phase as it illuminates the imaging screen 130. The interference intensity pattern 135 imaged by the camera 140 will therefore represent a uniform pattern which the processing system 145 will interpret as requiring no additional corrective action. Also, the charging beam pattern 55 and the discharging beam pattern 60 will be impinging a charging collector 65 and its interconnected discharging collector 70 with electron beams of substantially equal intensity. The result is that a particular charging collector 65 and its interconnected discharging collector 70 will be supplying a net charge that is substantially zero to its respective transmission wire 85a, 85b. In effect, electrical charges will be removed from the discharging collectors 70 as rapidly as charges are being supplied to the charging collectors 65. The piezoelectric wafer 245 will, at this point, maintain its deformed position because no additional charges will be supplied to it through the electrodes 95a, 95b, 95c, 95d nor will charges be removed from the electrodes. In effect, the piezoelectric wafer 245 will act like a capacitor to store the net charge transmitted to it. The ability of the wafer 245 to emulate a capacitor will be discussed further in the following paragraphs.

In FIG. 3, a detailed illustration is given of the electronbeam charging system 50. It should be understood immediately that the primary difference between the charging system 50 and discharging system 45, as depicted in FIGS. 1 and 2, is the type of collectors contained therein. In FIG. 3 the charging system 50 is depicted, as evidenced by the charging collectors 65 contained therein. The discharging system 45 could be substantially similar to the charging system 50 depicted in FIG. 3 except that discharging collectors 70 will be contained therein rather than the charging collectors 65. Also, the charging system 50 and discharging system 45 could each be contained within separate vacuum chambers to simplify construction and configuration of the collectors. Light point 25 and light ray 165b reflected from the first splitter 30 pass through window 170 and a mechanical iris 205. The iris 205 allows the light points and light rays at the centermost portion of the iris 205 to pass therethrough unobstructed first, while the remaining light points and light rays are allowed to pass therethrough as the iris 205 is opened radially outward. It should be appreciated, however, that the iris could be located at various locations within the system. For example, a mechanical iris could be disposed over the mirror surface 260 to controllably obstruct the incoming wavefront 5. An electrical iris could also be fashioned by selectively grounding the charging collectors 65 so that the centermost collectors 65 within the charging system 50 are the only collectors 65 initially ungrounded, and then removing the grounding in sequential fashion from the remaining charging collectors 65. By controllably obstructing the light points and light rays that reach the photocathode 40, phase errors of more than $2\pi$ radians can be corrected. Phase ambiguities or "creases" in the mirror surface 260 that could arise if all the electrodes 95a, 95b, 95c, 95d were addressed simultaneously will also be avoided by deforming the mirror surface 260 from the center radially outwards.

As the light point 25 and light ray 165b illuminate the photocathode 40, an emission of electrons from the reverse side of the first photocathode 40 occurs that corresponds to the position of light point 25 and light ray 165b as they illuminate the surface of the photocathode 40. The electrons are then amplified and accelerated as they pass through a microchannel plate preamplifier 180, resulting in the charging beam pattern 55. The electrons of charging beam pattern 55 then impinge a first plate of a multi-channel plate power amplifier 190. The power amp 190 will have a plurality of plates, typically five or more, made from copper or any other suitable conducting material, with a typical voltage of 200 volts applied between adjacent plates to generate a total potential of typically 1200 volts or more. Each plate of power amp 190 will further have a plurality of closely aligned channel holes 195 corresponding to the plurality of charging collectors 65 for receiving therethrough the electrons impinging the first plate of the power amp 190. The inside surfaces of holes 195 of each plate will further be coated with a substance, such as magnesium-oxide (MgO), to facilitate an emission of secondary electrons therefrom. In FIG. 3, only four closely aligned channel holes 195 have been illustrated for simplicity. As electrons pass through the channel holes 195 they cause an emission of secondary electrons which are focused into electron beams 200. The electron beams 200 will selectively vary in intensity, and will impinge the charging collectors 65.

The charging collectors 65 will typically be 0.1 cm to 0.3 cm in diameter, and the discharging collectors 70 will be of a similar diameter. An electrical shield 220, typically made of copper or other conducting material and having a hole 215 with a diameter slightly larger than that of a collector for each collector, will be disposed within the charging system 50 to circumscribe each collector 65 therein. The electrical shield 220 will be held at a high-positive voltage of about 2 KV to facilitate attraction of stray electrons between adjacent charging collectors 65. Shield 220 is especially helpful in the discharging system 45, where the electrons impinging the discharging collectors 70 will, in effect, be removing or "knocking off" electrons on the discharging collectors 70. The shield 220 prevents an arcing condition that might exist between adjacent discharging collectors 70 when electrons on the discharging collectors 70 are removed therefrom by the discharging beam 60.

To facilitate charging, the charging collectors 65 will be made from a material having a secondary-electron emission coefficient less than unity, such as metal. The secondary-electron emission coefficient will be the number of secondary-electrons emitted from a charging collector 65 as a result of bombardment of primary electrons of the electron beams 200, divided by the number of electrons actually impinging the charging collector 65. The discharging collectors 70, however, will be coated with a material, such as magnesium oxide, to provide a secondary-electron emission coefficient greater than unity, to thereby facilitate the emission of secondary-electrons therefrom as a result of bombardment of electrons from the discharging beam pattern 60. With magnesium oxide and an electron beam voltage of 1200 volts, three to fifteen secondary electrons can be created for each primary electron striking each discharging collector. Discharging of the discharging collectors 70 and the piezoelectric wafer 245 will therefore result because the number of secondary-electrons emitted from the discharging collectors 70 will exceed the number of electrons of the discharging beam 60 impinging thereon. The discharging of the discharging collectors 70 will also be aided if the discharging collectors 70 are angled as illustrated in FIGS. 1 and 2. With an angled shape, secondary-electrons will be more easily displaced from the discharging collectors 70 than they would be were the discharging collectors 70 flat like the charging collectors 65.

FIG. 3 also illustrates the deformable mirror 10 in an exaggerated deformed state for receiving and correcting the incoming distorted wavefront 5. The monolithic piezoelectric wafer 245, which will typically be seven to ten centimeters in diameter, is depicted with a plurality of holes 250 therein for receiving the transmission wires 85a, 85b, and a metallized grounding element 240 having a corresponding plurality of holes affixed to a second side of the wafer. The transmission wires 85a, 85b are connected to a corresponding plurality of electrodes 95a, 95b, 95c, 95d shown recess mounted in a first side of wafer 245.

If wafer 245 is made from PZT-4, a typical piezoelectric material manufactured by the Vernitron Corp., the wafer will have a piezoelectric constant (d) of $3 \times 10^{-10}$ meters/volt and a dielectric constant ($\epsilon$) of $6 \times 10^{-9}$ farads/meter. If the thickness of the wafer is z, which will be 1 cm for a typical wafer, the actual displacement $\Delta z$ of the piezoelectric material will be proportional to the net charge (Q) on its surface area (A). The relationship between the wafer's displacement and charge can thus be expressed as $\Delta z/z = (Q/A) \times (d/\epsilon)$. To obtain a displacement $\Delta z$ of 0.5 micrometers, for a visible wavelength, using a piezoelectric material with piezoelectric and dielectric constants as mentioned above, a Q/A value of $10^{-7}$ coulomb/cm$^2$ will be needed. The multichannel plate power amp 190 disclosed herein will readily meet this requirement by supplying 40 $\mu$amp or more electron beams to the piezoelectric wafer 245. A major advantage of using charge control over voltage control is therefore the ability of the piezoelectric wafer 245 to act electrically as a capacitor and hold the net charge being applied or removed to its surface by the electrodes 95a, 95b, 95c, 95d. In this manner, charge control enables a deformation of wafer 245 to be increased or decreased with integration-like control. Charge control will also apply equally well to "stacked" piezoelectric discrete actuator elements each having a plurality of small piezoelectric wafers stacked one upon the other to form one composite wafer, with electrically isolated electrodes interspersed uniformly therebetween for increasing the deformability of the composite wafer.

The slew velocity of the piezoelectric wafer 245, or its ability to track rapidly changing atmospheric disturbances, will be proportional to the current applied to charge or discharge the electrodes 95a, 95b, 95c, 95d. The current ($\Delta Q/\Delta t$) required to produce a particular slew velocity of the wafer ($\Delta z/\Delta t$) may therefore be expressed as $(\Delta Q/\Delta t) = (A/z)(\epsilon/d)(\Delta z/\Delta t)$. Using the same piezoelectric and dielectric constants as used in the preceding paragraphs, $\epsilon/d = 2 \times 10^{-3}$ coulomb/cm$^2$, and a worst case slew velocity of 0.08 cm/second, a portion of the wafer 245 would therefore require $(\Delta Q/\Delta t) = (0.25$ cm$)(2 \times 10^{-3}$ coulomb/cm$^2)(0.08$ cm/second$) = 40$ $\mu$amps, well within the capability of the charging system.

It should be appreciated that the disclosed invention will lend itself readily to a number of modifications without departing from the fair scope of the claims. For example, a crystal, such as a bismuth-silicon-oxide (Bi$_{12}$-

SiO$_{20}$) crystal, may be substituted for the deformable mirror 10 as the phase-modulating element. By placing selectively varying electrical charges at various points on its surface, its refractive index can be varied to selectively retard the velocity of propagation of select portions of an optical wavefront as the wavefront passes therethrough, thereby correcting the phase distortion in the wavefront.

Furthermore, while the preferred embodiment uses separate charging and discharging systems for each axis to simplify construction, the charging systems for the X and Y axes could be combined into a single charging system, and the discharging systems for both axes combined into a single discharging system by using the teachings hereinbefore disclosed. If so desired, both discharging and charging systems could even be incorporated into a single vacuum enclosed electron-beam generating system.

It should also be appreciated that while the invention yields its greatest cost savings in applications where a large plurality of electrodes, or actuator elements, are needed, it will work equally well with any number of electrodes. In addition, the invention is capable of not only correcting distorted wavefronts, but of modifying received wavefronts into a plurality of varying shapes.

We claim:

1. An adaptive-optics system for nulling phase distortion in a wavefront of a propagating wave, which is incident on an optical element, the system comprising:
   lenslet array-type sensor means for receiving the wavefront and generating a plurality of light points indicative of wavefront tilt at a plurality of locations on the wavefront;
   image intensifier means for amplifying the light points;
   compensation means for computing and superimposing compensation signals on the light points, thereby producing a plurality of calibrated light points;
   electron beam generating means for converting the calibrated light points into a plurality of electron beams, the electron beams varying in intensity in relation to the calibrated light points and impinging a plurality of collectors within the generating means; and
   wherein said optical element is a selectively deformable mirror including a monolithic piezoelectric wafer, a mirror surface adhered to a first side of the piezoelectric wafer, and a plurality of selectively chargeable electrodes mounted in the piezoelectric wafer, whereby receipt of the electron beams of varying intensity upon the collectors results in selective charging or discharging of the electrodes, thereby selectively deforming the piezoelectric wafer and the mirror surface adhered thereto to null the phase distortion in the wavefront incident on the mirror surface.

2. The system of claim 1, which further comprises calibration means for generating a second output representing a correction of aberrations present in the sensor means and the modulating means, the second output subsequently being superimposed on the first output, thereby creating a third output for input to the electron beam generating means.

3. The system of claim 2, wherein the calibration means comprises:
   interferometer means for generating an interferogram indicative of the aberrations present in the sensor means and the modulating means;
   camera means for imaging the interferogram;
   processing means for receiving an image of the interferogram imaged by the camera means and computing compensation signals for correcting the aberrations indicated by the interferogram; and
   cathode ray tube means for receiving the compensation signals from the processing means and generating the second output, the second output being light rays of varying intensities emanating from the cathode ray tube means and representing the compensation signals supplied by the processing means.

4. The system of claim 1, wherein the electron beam generating means comprises:
   a vacuum contained charging system for selectively generating charging electron beams, the electron beams generated within the charging system being operable to supply the charges to the modulating means;
   a vacuum contained discharging system for selectively generating discharging electron beams, the electron beams generated within the discharging system being operable to remove the charges from the modulating means;
   a plurality of charging collectors housed within the charging system for receiving the charging beams, the charging collectors being operable to facilitate an accumulation of the charges thereon; and
   a plurality of discharging collectors housed within the discharging system for receiving the discharging beams, the discharging collectors being operable to selectively remove the electrical charges from the modulating means.

5. The system of claim 4, wherein the charging and discharging systems each further comprise:
   at least one photocathode for receiving thereon the first output and emitting a plurality of electrons in response thereto;
   at least one microchannel plate preamplifier means for amplifying the electrons;
   at least one multi-channel plate amplifier means for further amplifying and focusing the electrons into a plurality of electron beams.

6. The system of claim 5, which further comprises a shielding element circumscribing the collectors, the shielding element having a voltage applied thereto to facilitate a vacuum-like receipt of stray electrons.

7. The system of claim 4, wherein the discharging collectors have an angled surface for facilitating displacement of electrons collected thereon when the collectors are irradiated by the electron beams.

8. The system of claim 1, wherein the electron beam generating means comprises:
   a vacuum contained electron beam charging system, the charging system being operable to supply electrical charges to the electrodes in the deformable mirror;
   a vacuum contained electron beam discharging system, the discharging system being operable to remove the electrical charges from the electrodes.

9. The system of claim 8, wherein the charging and discharging systems each further comprise:
   at least one photocathode for receiving the light points and emitting a corresponding plurality of electrons from a reverse side thereof;

at least one microchannel plate preamplifier for receiving and amplifying the electrons;

at least one multi-channel plate power amplifier having a plurality of closely aligned channel holes, whereby electrons passing through the channel holes are further amplified and focused into the electron beams.

10. The system of claim 1, wherein the collectors are charging or discharging collectors, the charging collectors being operable to supply electrical charges to the electrodes, and the discharging collectors being operable to facilitate the removal of electrical charges from the electrodes, whereby selective charging and discharging of the collectors operates to selectively charge and discharge the electrodes, thereby selectively deforming the piezoelectric wafer.

* * * * *